Sept. 27, 1932. D. H. DAVIS ET AL 1,880,123
ARTICULATED SEMITRAILER CONSTRUCTION
Filed June 4, 1931 2 Sheets-Sheet 1
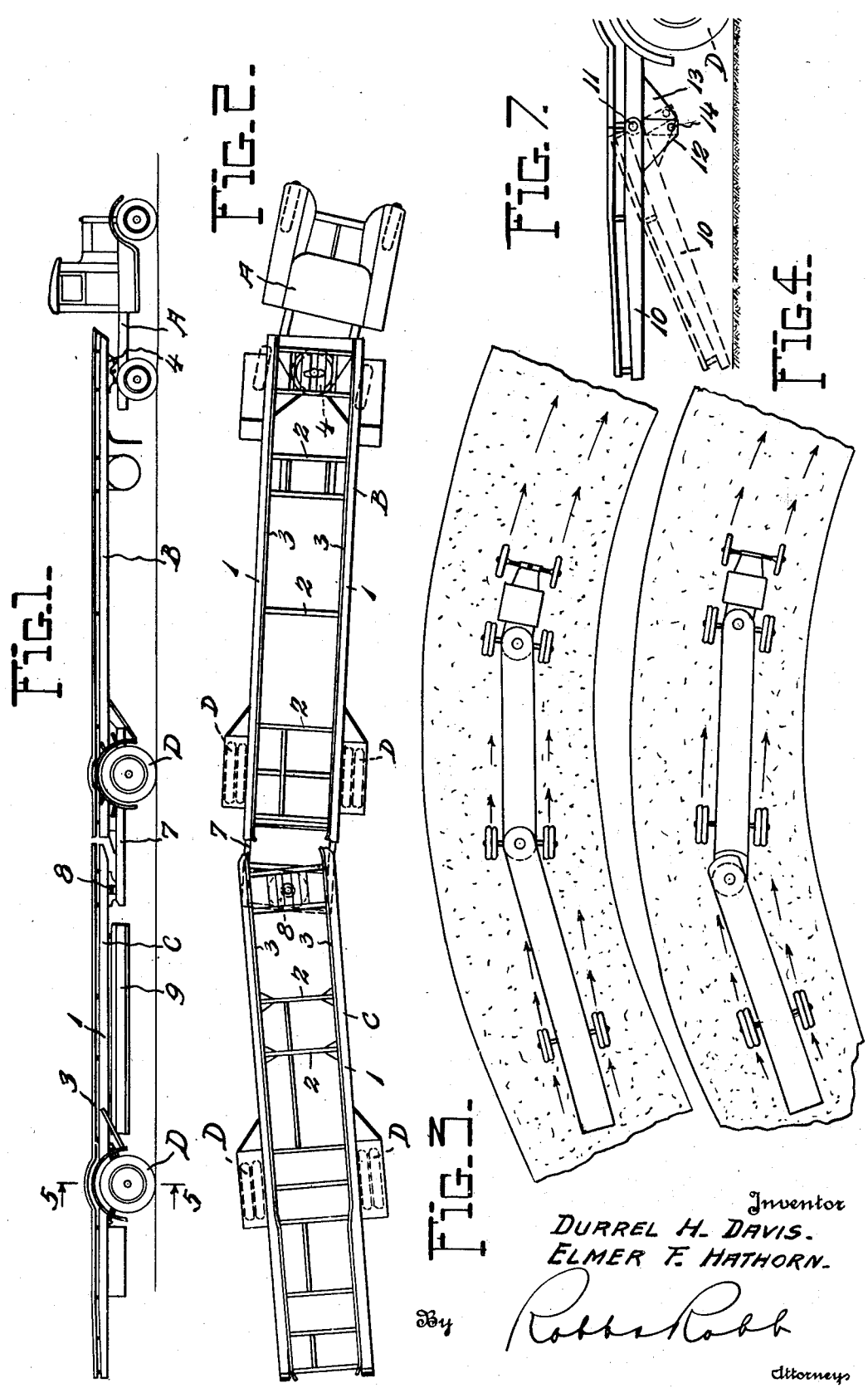
Inventor
DURREL H. DAVIS.
ELMER F. HATHORN.
By Robb & Robb
Attorneys

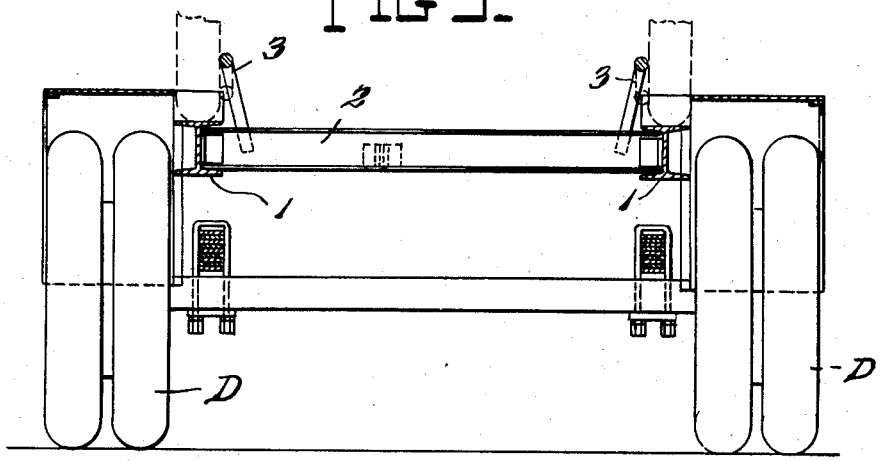
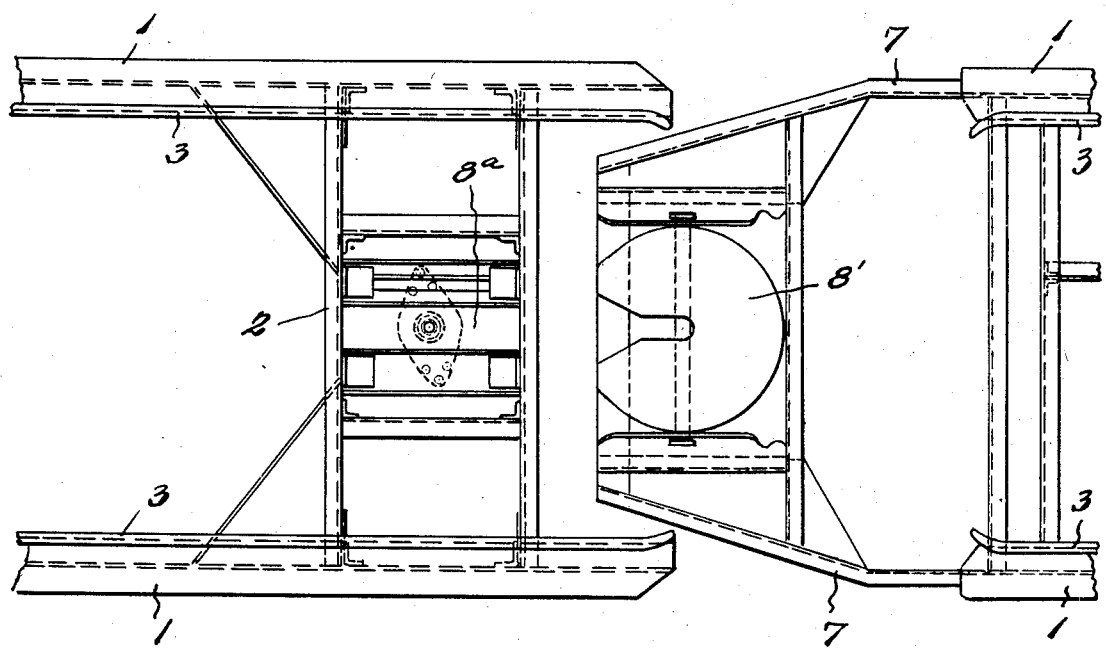

Patented Sept. 27, 1932

1,880,123

UNITED STATES PATENT OFFICE

DURREL H. DAVIS AND ELMER F. HATHORN, OF EDGERTON, WISCONSIN, ASSIGNORS TO HIGHWAY TRAILER COMPANY, OF EDGERTON, WISCONSIN, A CORPORATION

ARTICULATED SEMITRAILER CONSTRUCTION

Application filed June 4, 1931. Serial No. 542,165.

This invention relates to improvements in articulated vehicles in which a plurality of vehicles are connected together and operated as a train for capacity transportation.

In the commercial use of this type of transportation today, high speed becomes more and more a demand, but with the present day equipment such speed is not only impractical but even moderate speed is actually dangerous because of the tendency for the trailing vehicles to whip or snake from side to side of the highway. This is particularly true in all four-wheel trailer equipment, and hence it is that regulations have been put into effect restricting the all-over length and operation of these trains.

Furthermore, owing to the usual method of coupling one vehicle with another, the trailers do not track with one another, making it difficult to negotiate turns without driving into the path of oppositely moving traffic.

In general, it will be understood that the primary object of these improvements is to overcome these difficulties by the provision of a special form of frame construction involving a drop or subframe connection permitting overlapping of the vehicle frames, which is especially advantageous for the purposes in that it permits the supporting frames of the vehicles to lie in corresponding horizontal planes and to be so closely associated as to afford a substantially continuous support or runway for the full length of the train. This arrangement lends itself particularly to that type of equipment designed for transportation of automobiles in which the vehicles are loaded onto the train at one end and rolled up to the forward end upon the frame supports, the over-all dimension of the vehicles being available for use.

Other objects and advantages of the invention will be hereinafter set forth and the novel features thereof defined by the appended claims.

In the drawings,

Figure 1 is a side elevation of a vehicle train embodying these improvements,

Figure 2 is a top plan view thereof,

Figures 3 and 4 are diagrammatic illustrations clearly showing the difference in the tracking of trailer vehicles when provided with the new type of vehicle construction as compared with the arrangement in use at the present time, Figure 5 is a transverse sectional view taken about on the plane 5—5 of Figure 1, Figure 6 is a fragmentary plan view of the contiguous ends of trailer vehicles, separated to show more clearly the fifth wheel connection intermediate the vehicle ends, and Figure 7 is a fragmentary view showing a modified construction of trailer frame in which a movable section of the frame constitutes a runway.

Referring to Figures 1 and 2 of the drawings A designates a tractor of conventional form; B the forward trailer and C the rear trailer of a vehicular train. It will be observed that the vehicles B and C are what are known as semi-trailers, each being provided with a two-wheel running gear D.

Since the form of vehicle illustrated is that type designed for transporting automobiles, the frame work or chassis is of more or less light fabrication, essentially comprising the longitudinal side members 1 connected by transverse bars 2 suitably located at spaced intervals. In so far as the longitudinal members 1 are concerned, they are preferably I-beam constructions so as to afford sufficient rigidity without trussing, the upper surface of each beam constituting a runway for the loaded vehicles. Of course, the members 1 are necessarily spaced the proper distance to accommodate the wheels of the automobiles to be carried thereon, and associated with each runway is a guard rail 3 which will act to guide the vehicles in movement to and fro upon the frame and prevent lateral displacement during transportation.

The tractor A has a tiltable fifth-wheel mounting 4 to receive the upper fifth-wheel member of the trailing vehicle, this fifth wheel construction being of a well known type.

The important feature of construction of the trailer B is the special subframe 7 which is rigidly connected to the rear end of the trailer so as to project a substantial distance therefrom and from the wheel support D. The drop of this frame from the plane of the main frame is sufficient to accommodate a fifth wheel connection 8 intermediate the trailers B and C so that the main frame of the latter will lie in the same horizontal plane of the frame of the former. It will be observed also that the forward end of the rear trailer overlaps the subframe 7 and terminates in close proximity to the rear end of the main frame of the forward trailer thus enabling the automobiles to be rolled from one trailer to another without difficulty.

Speaking with reference to the function of the subframe connection, it will be noted from the diagrammatic showing in Figure 3 of the drawings that where, as in the usual type of trailer connection, the swivel axis is disposed on the rear end of the main frame of the forward trailer, the wheels of the rear trailer take an inner arc of travel, precluding any possibility of tracking with the forward trailer. In the construction embodying this invention, however, as clearly shown in Figure 4 as the front end of the forward trailer is swung around the subframe extension swings outwardly, carrying with it the front end of the trailing vehicle, which action tends to bring the wheels of the latter into tracking relation to the forward trailer wheels. This is obviously of great importance and by virtue of the use of the fifth wheel connection and the use of the semi-trailer in these vehicular trains, it is impossible for any snaking action to take place, regardless of the number of vehicles of which the train is composed. Furthermore, it is comprehended to employ in such constructions as herein set forth bodies which may be provided with interlocking communicating passages at the jointed ends so as to afford a continuous passage from one vehicle to the other. The fifth wheel construction designated 8 is composed of the tiltable split wheel member 8' shown clearly in Figure 6 mounted upon the subframe extension 7 and the upper kingpin section 8ª mounted upon suitable supports at the forward end of the trailing vehicle.

To enable the loading of automobiles upon the trailer vehicle shown in Figures 1 and 2 the usual skids or detachable runways are employed, which when not in use are hung upon the sides of the frame of the vehicle as shown clearly in Figure 1 where one of these skids is designated by the reference numeral 9.

As a modified form of construction of trailer frame, it is contemplated to hinge a section of the rear trailer frame as shown in Figure 7 of the drawings so that it is only necessary to drop the end of this section to the ground to provide the necessary runway. In this figure the hinge section which forms a continuation of the main frame is designated 10 mounted upon the pivotal axis 11 and having a bracket 12 which is designed to cooperate with a corresponding bracket 13. Each of these brackets is provided with a suitable opening into which a locking member 14 may be inserted for holding the frame in its elevated position. It will be understood that any desired form of trussing and locking means for this swingable section may be employed, that given in the drawings being merely illustrative of the principle involved. It will also be apparent that the main frame construction may be otherwise modified in details to enable its use for different types of vehicles and it is not intended that the invention should be restricted to the particular frame construction illustrated except as may be defined by the claims hereto annexed.

Having thus described my invention, what we claim as new and desire to secure by Letters Patent is:

1. In a vehicular train, the combination of a plurality of semi-trailers having certain of their ends in contiguous relation, each comprising a main frame, a subframe support intermediate the contiguous ends of the trailer and arranged below the plane of the main frames in such position as to dispose the said main frames in the same horizontal plane to bring each semi-trailer into tracking relation with the remaining semi-trailers of the train, and a rocking split fifth wheel connection between the vehicles, one part thereof being mounted on the end of the subframe and the other part being carried in spaced relation to the front end of the connecting vehicle.

2. In a vehicular train, the combination of a plurality of semi-trailers, having certain of their ends in contiguous relation, each composed of a main frame, the longitudinal members of which constitute vehicle trackways, a subframe connected to and extending from the end of one main frame into contiguous relation with respect to the contiguous end of the other main frame, and a fifth wheel device intermediate the subframe and the end of the other trailer vehicle providing a swivel connection therefor, so that as the train travels around the curve the front end of each semi-trailer of the train swings around and causes the extending subframe of each succeeding semi-trailer to be swung outwardly successively to bring each semi-trailer into tracking relation to the remainder of the semi-trailers of the train.

In testimony whereof we affix our signatures.

DURREL H. DAVIS.
ELMER F. HATHORN.